(12) United States Patent  (10) Patent No.: US 7,685,771 B2
Jung  (45) Date of Patent: Mar. 30, 2010

(54) CONSERVATION PLANT POT

(76) Inventor: Man-Young Jung, 2750 E. Washington Blvd., Ste 150, Pasadena, CA (US) 91107

(\*) Notice: Subject to any disclaimer, the term of this patent is extended or adjusted under 35 U.S.C. 154(b) by 44 days.

(21) Appl. No.: 11/810,841

(22) Filed: Jun. 7, 2007

(65) Prior Publication Data

US 2008/0302008 A1  Dec. 11, 2008

(51) Int. Cl.
A01G 25/00 (2006.01)
(52) U.S. Cl. .............................. 47/79; 47/48.5
(58) Field of Classification Search ............. 47/79, 47/80, 48.5, 65.5, 59 R, 62 E, 66.6, 62 R, 47/81, 63
See application file for complete search history.

(56) References Cited

U.S. PATENT DOCUMENTS

| | | | | |
|---|---|---|---|---|
| 4,437,264 A | * | 3/1984 | Carlisle ...................... | 47/62 R |
| 4,545,145 A | * | 10/1985 | Torrance ..................... | 47/48.5 |
| 4,805,343 A | * | 2/1989 | Patterson et al. .............. | 47/79 |
| 6,584,730 B1 | * | 7/2003 | Mai ............................. | 47/79 |
| 7,418,799 B1 | * | 9/2008 | Witt ............................ | 47/81 |

\* cited by examiner

*Primary Examiner*—T. Nguyen
(74) *Attorney, Agent, or Firm*—Clement + Cheng

(57) ABSTRACT

A plant pot system has at least one plant pot with side walls, an open top and a bottom wall for containing planted soil that receives a routine watering through the open top, the plant pot having two parallel rows of a number of through holes aligned circumferentially, each of the through holes being blocked by a removable closure; one or more additional pot members with the same number of through holes at levels corresponding to the through holes of the first plant pot; and at least one water leveling members for fluidly connecting any desired number of laterally disposed plant.

12 Claims, 4 Drawing Sheets

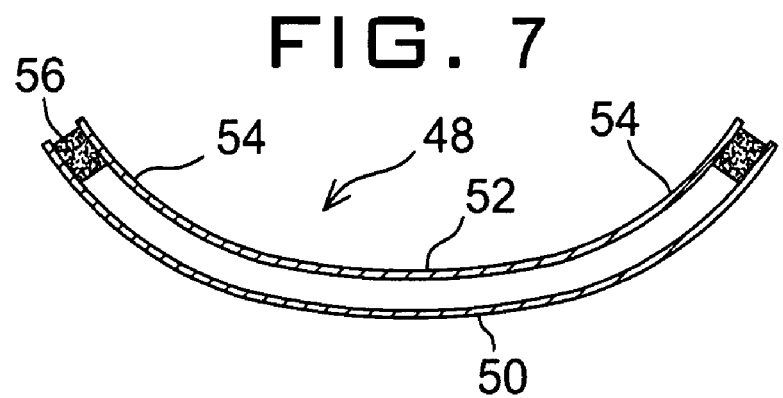
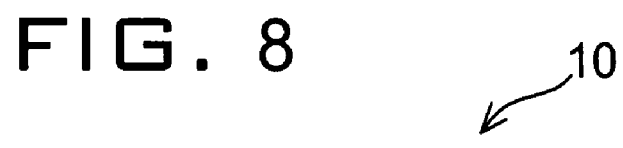
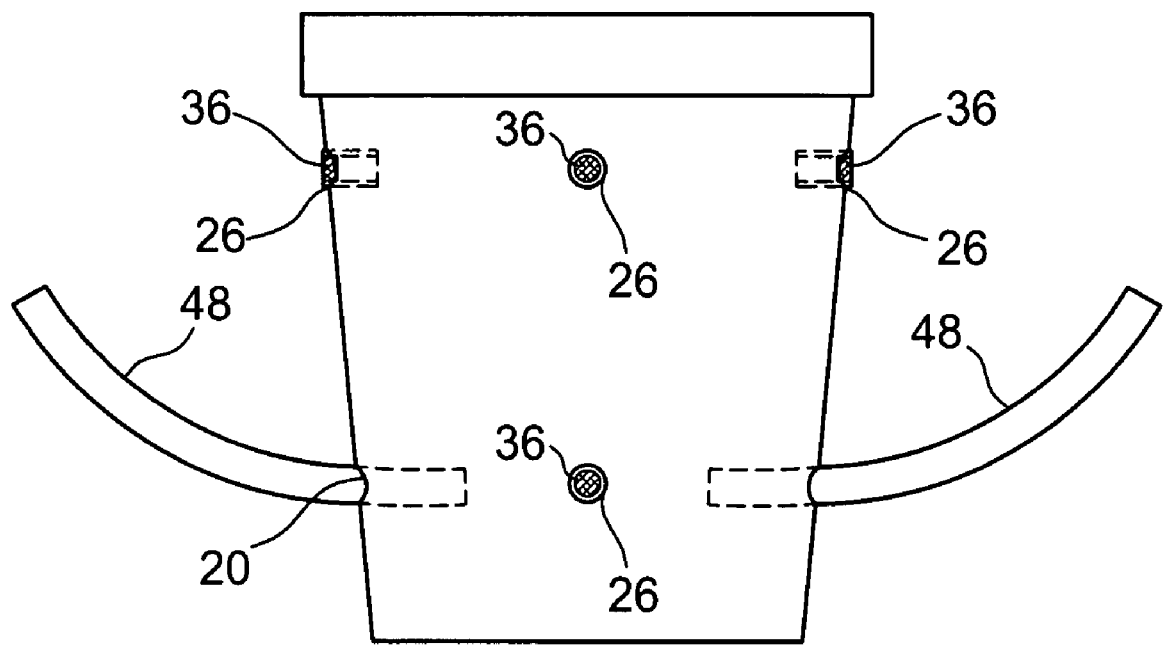

CONSERVATION PLANT POT

BACKGROUND OF THE INVENTION

A. Field of the Invention

The present invention relates to a plant pot. More particularly, the present invention relates to a modular plant pot that can be grouped with multitudes of similar modular plant pots in fluid communications among them to automatically exchange a single water supply to any one pot with the rest of the pots in the same group minimizing wastes of daily planting water that constitutes a significant portion of water consumption in the nation.

B. Description of the Prior Art

A wide variety of self watering plant pots have been patented. U.S. Pat. No. 5,272,835 to Stern describes an example of self-watering pot comprising a doubled-walled container having an irrigation chamber embedded. The irrigation chamber contains a plurality of serially arranged irrigation ducts that reside just above the soil surface. A transport channel connects the irrigation chamber to a water input pipe extending through from the container's outside wall. A regulating valve is attached to the other end of the input pipe promoting optimal plant growth and a water supply line is attached to the input side of the valve. The water supply is turned on causing water to flow from the valve, through the input line, into the transport channel, and into the irrigation chamber. Finally, the water passes through the irrigation ducts and is uniformly distributed onto the soil surface.

This and other pot improvements have been made around each unit pot structure to better control the watering in its time, amount and place to release in the given pot body. However, as the national drought stricken and water conservation becomes the state of problem, there is an urgent need for an advanced approach to draw an excess potting water before it may be undesirably overflowing or over saturate the pot soil. At the same time, the solution should incur a negligible cost increase to justify the trouble of replacing the existing pots or repotting and it should be simple enough for a quick start to save water instantly.

In view of the foregoing, an object of the present invention is to provide a modular plant pot for cooperating with neighboring pots of the same type to share a single source of water at the moment of wetting the pots.

Another object of the present invention is to provide minor modifications to a conventional pot and to use common materials for the fluid communications between the modular pots.

SUMMARY OF THE INVENTION

A plant pot according to the present invention normally operates in a group of modular components although in its singular form the pot provides a unique advantage of controlling water to protect the plant from over watering. The pot part can be made of plastic or ceramic.

The plant pot may comprise a wider open top and a narrower bottom wall for containing planted soil that receives a routine watering through the open top. Additionally, the plant pot is provided with eight round holes of which four holes are positioned circumferentially at a lower level distanced one fourth of the height of the pot from its bottom and the same number of upper round holes at about three fourths of the height of the pot from the bottom line.

Arrangement of the modular pots is completely up to the imagination of a gardener who can have four such pots placed on a substantially flat surface and arranged in a rectangular pattern. A group of five pots may form a cross pattern of plants.

Each pot is preferably placed to face its neighboring pot directly with reference to the holes. A straight tubular connector penetrates the respective opposing holes of the adjacent pots for evenly distribute water poured at any one of the connected pots.

The connector may be made of semi-rigid material for making a watertight fitting with conventional solid materials of pots. At the time of watering, when the supplied water starts to wet the pot with the planted soil, it immediately saturates the soil and overflows through the connectors in the holes of the lateral pots. In the pot group of four, each pot will have four water holes left unused. In order to block these holes, multiple plugs are added. The plug may be made of a short length of a tube having an end extending obliquely like the slanted ends of the connector. The opposite end of the plug tube may extend perpendicular to the longitudinal axis of the tube. Then, a disc core may be driven into the inner diameter of the plug tube to complete a plug. The plug tube may be made of cork. Alternatively, the whole plug may be made of a cork stopper sized to block the hole tightly. Conversely, a solid tube, which is elastic or a rubbery member may replace the plug tube. The plant pots have the connector connection in the sidewall of the pot.

The connector having opposite ends facing the same direction such as upwards will offer a larger water inlet/outlet opened. Because the opposite ends are symmetrical the connector can't be inserted in a wrong direction into the pots. Thus, the connector provides an effective channel for transferring water from the saturated pot to the thirsty peripheral pots without regard to its lateral orientation. The connectors may be directly joined together with ease to extend the distance between the pots as needed. A filter may be plugged into each end of the connector in order to keep the interior of the connector from being blocked by outgrowth of the plant root or softened soil at watering.

An arcuate connector may be additionally provided. The connector may comprise a single arch of an imaginary circle or combined radii. The arcuate connector can be used to control single pot wherein two connectors penetrate the selected lower water holes, which may be opposite or at right angle to each other within a body of pot. Alternatively, the connector may be used as a right-angle connector for laterally connecting two pots positioned obliquely. A spongy connector rod may also be provided for fluidly connecting two adjacent pots. The connector rod may comprise a sponge core and an outer shell and is terminated by symmetrically slanted edges. The outer shell may be a tube of coated paper or a thin plastic pipe cut to shape. Osmosis occurs through the connector rod resulting in movement of water to level the water volume of the two sides.

Embodiments of the invention will now be described by way of example with reference to the accompanying drawings.

BRIEF DESCRIPTION OF THE DRAWINGS

FIG. 7 is a cross sectional view of a right-angle connector for laterally connecting two pots positioned obliquely.

FIG. 8 shows a single pot with two right-angle connectors used to control excess water.

FIG. 9 is a cross sectional view of a spongy connector rod for fluidly connecting two adjacent pots.

Similar reference numbers denote corresponding features throughout the attached drawings.

DETAILED DESCRIPTION OF THE PREFERRED EMBODIMENT

Figure 1:
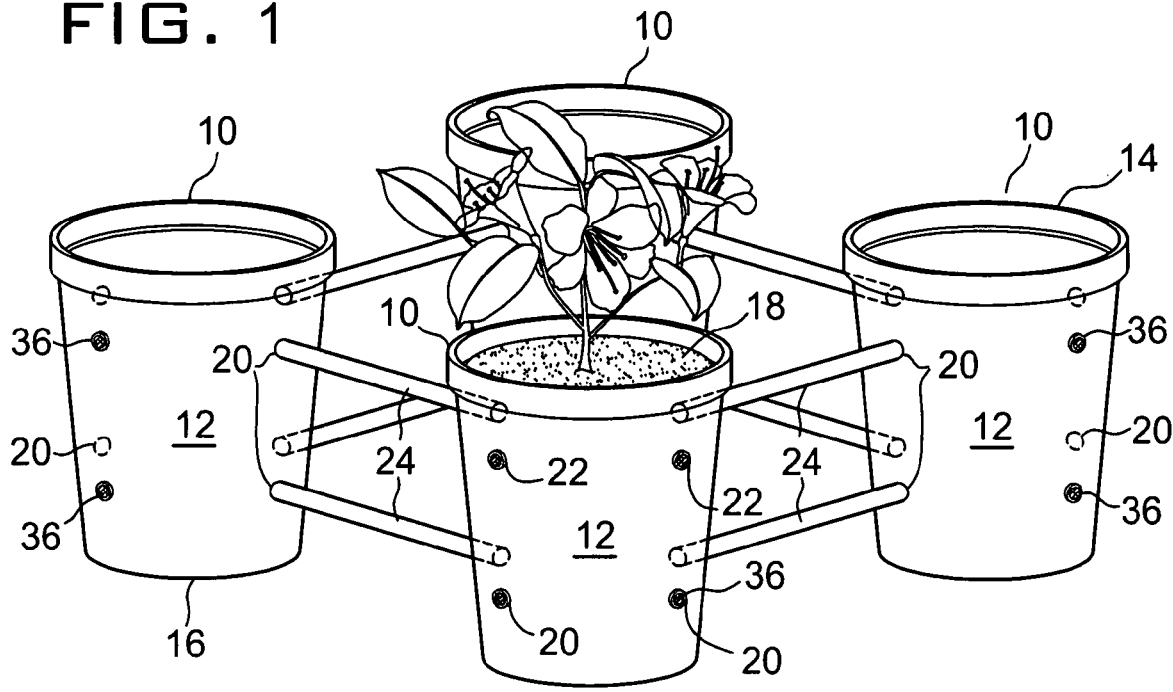
FIG. 1 is a perspective view of a group of modular pots including a planted pot fluidly connected to three other pots with emptied interiors for the sake of simplicity.

With reference to FIG. 1, a group of plant pots 10 according to the present invention is shown constructed in conventional manner except a matrix of watering holes on the sidewalls 12 of the pot 10.

The plant pot may also comprise a wider open top 14 and a narrower bottom wall 16 for containing planted soil 18 that receives a routine watering through the open top 14. The plant pot 10 may be in the form of a deep round vessel that is provided with eight round holes of which four holes 20 are positioned circumferentially at a lower level distanced one fourth of the height of the pot 10 from its bottom. The holes 20 may be formed at the same time of molding the pot 10 or bored through the pot walls horizontally and in parallel with the bottom walls 16. Then, the angular distance between the holes 20 becomes 45 degrees facing four different directions. Directly above the lower holes 20 are formed the same number of upper round holes 22 at about three fourth of the height of the pot 10 from the bottom line.

Figure 2:
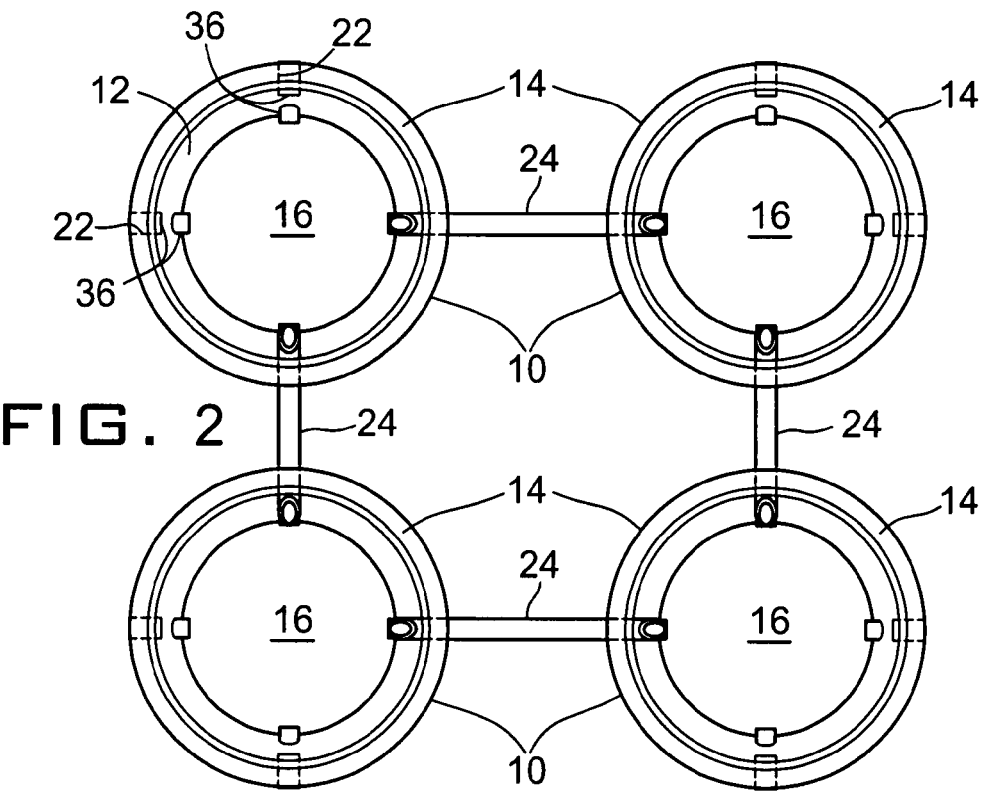
FIG. 2 is a plan view of the modular pots grouped in a rectangular pattern for synchronized watering according to the present invention.

In the illustrated example, there are four such pots 10 placed on a substantially flat surface and arranged in a rectangular pattern. As shown in FIG. 2, each pot 10 is placed to face its neighboring pot 10 directly with reference to the holes 20. A straight tubular connector 24 penetrates the respective opposing holes 20 of the adjacent pots 10 to evenly distribute water poured at any one of the connected pots 10. Simply taking a cut of a variety of tube products may make the connector 24. It may be of a plastic or rubber material or other types of synthetic resin. A coated paper tube may be used for the connector 10 as long as it supports itself and has a good resistance against water penetration. Even an organic material of hollow bamboo cut may be used to obtain the same benefit of the invention.

Considerations are necessary to make a good sealed connection between the pots. Since conventional pots are normally made from terra cotta, stone, wood or plastic material, which is rigid, a relatively soft tube material is preferred for the connector 24 to establish a tight fit into the hole 20. Conversely, when a rigid tube is to be used for the connector 24, each hole 20 may be lined with a soft sleeve or an elastic coating to secure a tight union between the connector 24 and hole 20 eliminating a leak of the valuable resource of water.

Figure 3:
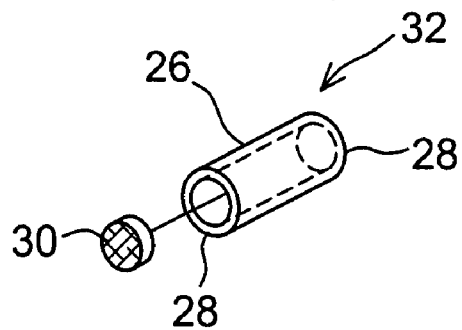
FIG. 3 is a perspective view of a shorter tubular plug for blocking the water holes in the pots.

At the time of watering, when the supplied water starts to wet the pot 10 with the planted soil 18, it immediately saturates the soil and overflows through the connectors 24 to the holes 22 of the surrounding pots 10. In the pot group of four, each pot 10 may be connected to two adjacent pots and have four water holes 20 left unused. In order to block these holes 20, multiple plugs are necessary. FIG. 3 shows a short length of a tube 26 having two cross cut edges 28. One of the edges 28 may be cut obliquely to have an acute tip to facilitate inserting the tube 26 into the hole 20 of the pot 10.

The tube 26 may be of the same material to make the connector 24. The tube 26 forms a plug shell into which a disc core 30 may be driven to complete a tubular plug 36. The disc core 30 may be made of cork. Alternatively, the whole plug 36 may be made of a cork stopper sized to block the hole 20 tightly. Conversely, a solid tube, which is elastic or a rubbery member may be used as a plug 36.

Figure 4:
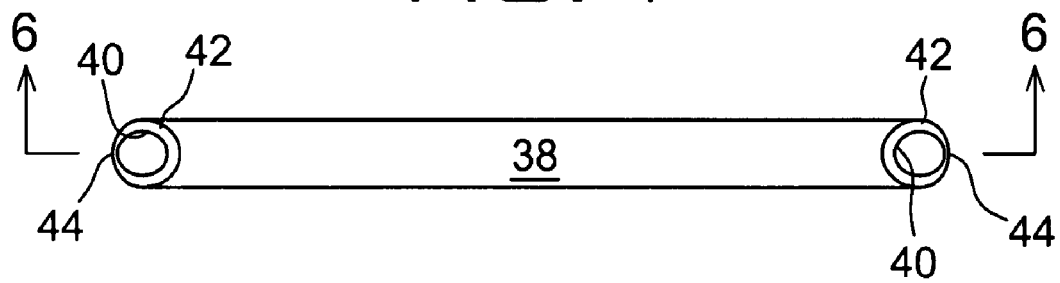
FIG. 4 is a plan view of a tubular connector for connecting two opposing water holes of the adjacent pots.

The connector 24 shown in plan view in FIG. 4 comprises a tubular body 38 having opposite ends 40 facing the same direction such as upwards. Upon insertion of the connector 24 in the pot 10 in this orientation, the connector 24 will offer a larger water inlet/outlet 40 opened due to its ends 42 facing obliquely upwards. Because the opposite ends 42 are symmetrical the connector 24 can't be inserted in a wrong direction between the front and back into the pots 10. Thus, the connector 24 provides an effective channel for transferring water from the saturated pot to the thirsty peripheral pots without regard to its lateral orientation. The connector end 42 may have an obtuse edge 44 to handle safely and yet it is sufficiently acute to penetrate the hole 20 of the pot 10 with ease.

Figure 5:
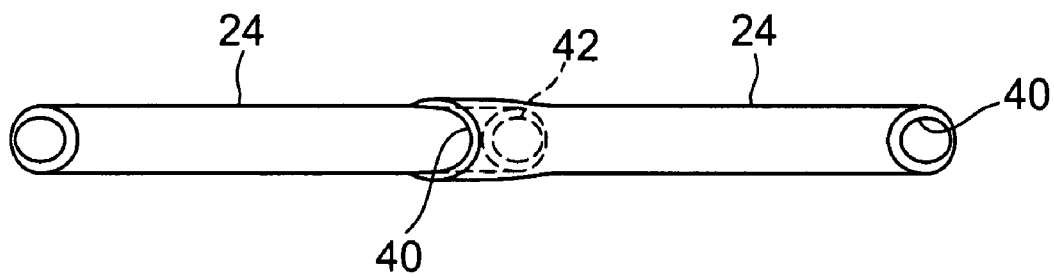
FIG. 5 shows two connectors press fitted together to double the length of a connector.

FIG. 5 shows that two connectors 24 are joined directly together by inserting the protruding edge 44 of the end 42 of one connector 24 into the large opening 40 of another connector 24 to lengthen the distance between the pots 10 as the plants in the pots grow to take more space.

Figure 6:
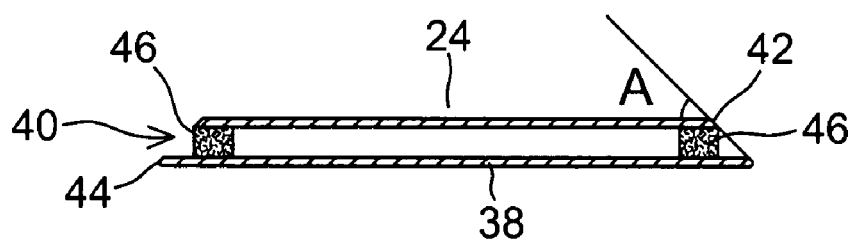
FIG. 6 is a longitudinal cross sectional view of a straight connector similar to the connector of FIG. 4 also showing optional filtering means installed.

Referring to FIG. 6, the connector 24 is shown in cross section along line 6-6 of FIG. 4. A filter 46 may be plugged into each end 42 of the connector 24 in order to keep the interior of the connector 24 from being blocked by outgrowth of the plant root or softened soil at watering. The filter 46 maybe a screen filter in a type utilizing a rigid or flexible screen to separate sand and other fine particles out of water. Typical screen materials may include stainless steel (mesh), polypropylene, and nylon.

The connector 24 may be made of a continuous supply of tubular body 38 cut obliquely to form the two ends 42 at even pitch so that every two neighboring connectors 24 are formed simultaneously with the same length and shaped ends 42. The oblique ends 42 of the respective connectors 24 may extend along 45 degrees toward the middle of the connector 24 with reference to the longitudinal axis of the tubular body 38.

An arcuate connector 48 shown in FIG. 7 is similarly based on a tubular body 50. The connector 48 may comprise a single arch of a circle or combined radii. The illustrated connector 48 has a middle portion 52 of a greater radius than those of the opposite end portions 54. Additionally, filters 56 may be installed to keep the interior of the connector 48 clean. The arcuate connector 48 may be used for different purposes. First, it can be used to control single pot 10 as shown in FIG. 8 wherein two connectors 48 penetrate the selected lower water holes 20, which may be opposite or at right angle to each other within a body of pot 10. The rest of the holes 20, 26 remain to be blocked by plugs 36. In order to hold the excess water, the arcuate connectors 48 are directed to face upward functioning as an extra reservoir. The angular position of the connector 48 may be set by the user who can push the connector 48 at a desired angle into the soil of the pot 10. Over a duration of repeated watering, the soil will set the positions of the connectors 48 in the pot 10. Alternatively, the connector 48 may have an internal bendable material such as a metal wire frame to hold the user's preferance of what position the connector 48 will remain. The filter 56 at each end of the connector 48 is optional and will prevent a foreign material from traveling in and out of the pot 10.

FIG. 9 shows a spongy connector rod 58 for fluidly connecting two adjacent pots 10. The connector rod 58 may comprise a sponge core 60 and an outer shell 62 and is terminated by symmetrically slanted edges 64. The outer shell 62 may be a tube of coated paper or a thin plastic pipe cut to shape. Osmosis is defined as the passage of water from a region of high water concentration through a semipermeable membrane to a region of low water concentration. The connector rod 58 may function as a tube that contains a semipermeable membrane, whereby the water molecules would flow from the side of watered pot to the dry pot. This flow of water, from the higher water concentration to the lower water concentration, results in movement of water to level the water volume of the two sides.

Figure 10:
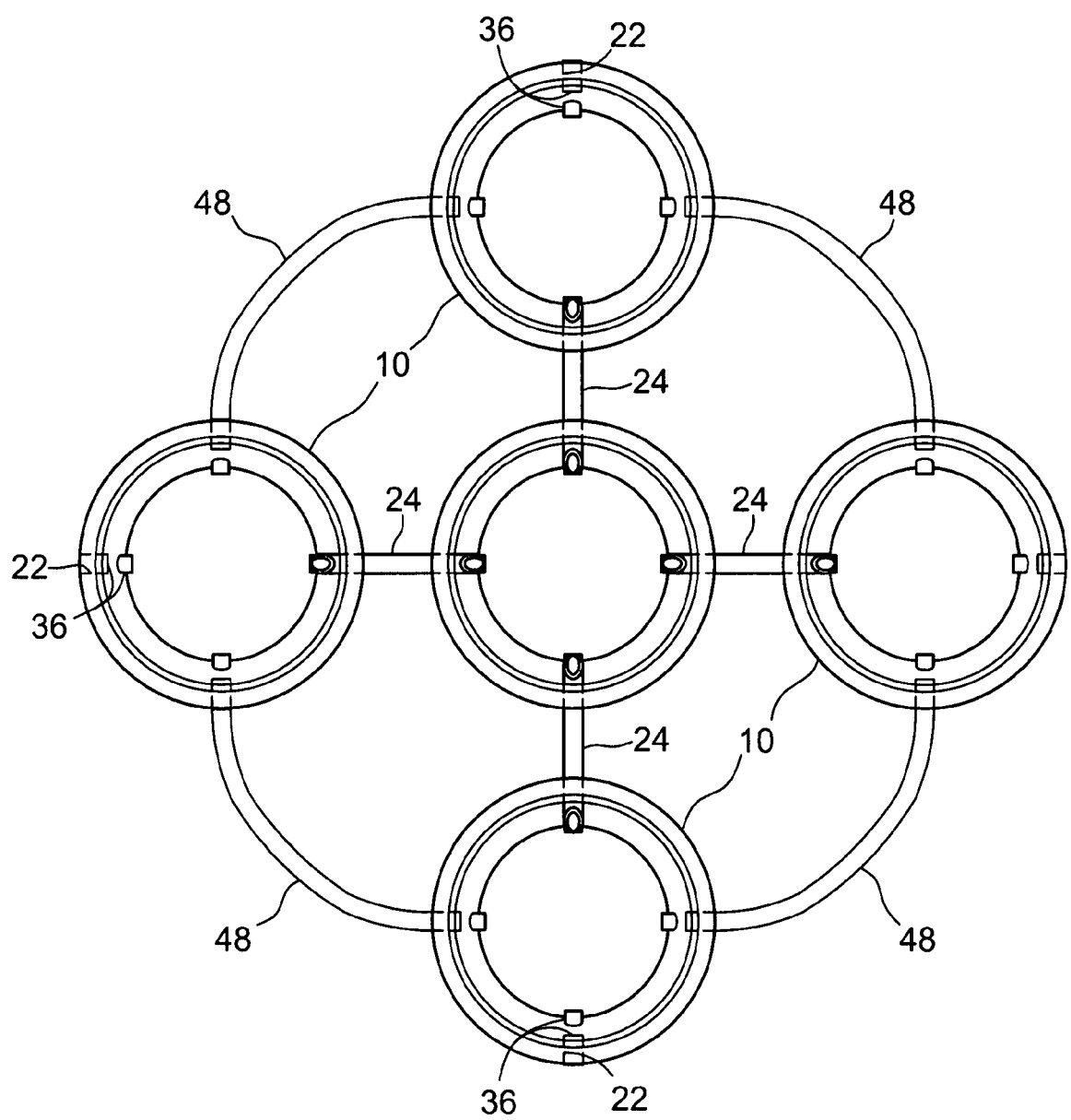
FIG. 10 is a plan view of the pot group in a cross pattern.

Referring further to a second array of the pots in FIG. 10, the operation of the present invention will be described. Encircling the pot 10 in the center, four more pots may be positioned so that adjacent pots have their corresponding holes 20 or 22 face directly opposite to each other. Each of the eight holes 20 of each pot 10 is initially closed by the plug 36.

The respective pots 10 may then allow potting with a plant and soil as a normal plant pot would. Due to the plugs 36 preoccupying the inner space of the connecting holes 20, 22 and further into the interior of the pots 10, placing both ends of the connectors 24, 48 in the pots 10 may be performed either easily before or after the potting process.

Therefore, while the presently preferred form of the conservation plant pot has been shown and described, and several modifications thereof discussed, persons skilled in this art will readily appreciate that various additional changes and modifications may be made without departing from the spirit of the invention, as defined and differentiated by the following claims.

The invention claimed is:

1. A plant pot system comprising:
   a) at least one plant pot with side walls, an open top and a bottom wall for containing planted soil that receives a routine watering through the open top, the plant pot having multiple parallel rows of a predetermined number of horizontal through holes aligned circumferentially;
   b) removable closures for closing the through holes of the plant pot to keep the pot watertight; and
   c) water channeling means for insertion into the pot's holes in place of the removable closures to extend a single supply of water at the selected one of the plant pots externally thereof and further into a desired number of laterally disposed plant pots through the fluid connections by the water channeling means; and
   d) wherein each at least one plant pot has four through holes oriented at 90° from each other, wherein the removable closures are used to close the unused through holes.

2. The plant pot system of claim 1, wherein the water channeling means is formed by a length of a hollow tube sized to fit tightly into the through hole.

3. The plant pot system of claim 2, wherein the tube extends straight and has slanted ends at the opposite sides facing the same direction to extend the area of opening toward a water supply through the soil in one of two adjacent pots connected via the tubular water channeling means.

4. The plant pot system of claim 3, wherein the tubular water channeling means is flexible so that two units of the water channeling means are threaded together to extend the channel of water.

5. The plant pot system of claim 1, wherein the water channeling means is formed by a spongy connector rod for fluidly connecting two adjacent pots, the connector rod having a sponge core and an outer shell and terminated by symmetrically slanted edges, wherein the connector rod functions as a tube that contains a semipermeable membrane for allowing the water to flow from the side of watered pot to the dry pot.

6. A plant pot system comprising:
   a) at least three plant pots all having side walls, an open top and a bottom wall for containing planted soil that receives a routine watering through the open top, the at least three plant pots all having multiple parallel rows of a predetermined number of horizontal through holes aligned circumferentially;
   b) removable closures for closing the through holes of the at least three plant pots to keep the at least three plant pots all watertight; and
   c) at least three flexible tubes inserted between the holes of the least three plant pots in place of the removable closures to extend a single supply of water at a selected one of the plant pots externally thereof and further into a desired number of laterally disposed plant pots through the fluid connections by the at least three flexible tubes, wherein each of the at least three plant pots is connected to other plant pots by the at least three flexible tubes; and
   e) wherein each at least one plant pot has four through holes oriented at 90° from each other, wherein the removable closures are used to close the unused through holes.

7. The plant pot system of claim 6, wherein the at least three flexible tubes is formed by a length of a hollow tube sized to fit tightly into the through hole.

8. The plant pot system of claim 6, wherein the at least three flexible tubes extend straight and have slanted ends at the opposite sides facing the same direction to extend the area of opening toward a water supply through the soil in one of two adjacent pots connected via the at least three flexible tubes.

9. A plant pot system comprising:
   a) at least one plant pot with side walls, an open top and a bottom wall for containing planted soil that receives a routine watering through the open top, the plant pot having multiple parallel rows of a predetermined number of horizontal through holes aligned circumferentially;
   b) removable closures for closing the through holes of the plant pot to keep the pot watertight;
   f) water channeling means for insertion into the pot's holes in place of the removable closures to extend a single supply of water at the selected one of the plant pots externally thereof and further into a desired number of laterally disposed plant pots through the fluid connections by the water channeling means; and
   g) wherein each at least one plant pot has four through holes oriented at an angle from each other, wherein the removable closures are used to close the unused through holes.

10. The plant pot system of claim 9, wherein the water channeling means is formed by a length of a hollow tube sized to fit tightly into the through hole.

11. The plant pot system of claim 10, wherein the tube extends straight and has slanted ends at the opposite sides facing the same direction to extend the area of opening toward a water supply through the soil in one of two adjacent pots connected via the tubular water channeling means.

12. The plant pot system of claim 11, wherein the tubular water channeling means is flexible so that two units of the water channeling means are threaded together to extend the channel of water.

* * * * *